(12) United States Patent
Gansbuehler

(10) Patent No.: US 10,736,303 B2
(45) Date of Patent: Aug. 11, 2020

(54) PET FURNITURE FOR ACCOMMODATING DOGS

(71) Applicant: Anja Gansbuehler, Eibelstadt (DE)

(72) Inventor: Anja Gansbuehler, Eibelstadt (DE)

( * ) Notice: Subject to any disclaimer, the term of this patent is extended or adjusted under 35 U.S.C. 154(b) by 193 days.

(21) Appl. No.: 16/047,835

(22) Filed: Jul. 27, 2018

(65) Prior Publication Data

US 2019/0045742 A1    Feb. 14, 2019

(30) Foreign Application Priority Data

Aug. 11, 2017  (DE) .................... 20 2017 104 845 U

(51) Int. Cl.
*A01K 1/03* (2006.01)
*A01K 1/035* (2006.01)

(52) U.S. Cl.
CPC .............. *A01K 1/033* (2013.01); *A01K 1/035* (2013.01)

(58) Field of Classification Search
CPC ........ A01K 1/033; A01K 1/00; A01K 1/0035; A01K 1/0047; A01K 1/03; A01K 1/034; A01K 1/035; A01K 29/005
USPC .......................... 119/48, 497, 452, 453, 416
See application file for complete search history.

(56) References Cited

U.S. PATENT DOCUMENTS

| | | | | |
|---|---|---|---|---|
| 3,861,356 A | * | 1/1975 | Kulka ................... | A01K 1/033 119/482 |
| 4,962,729 A | * | 10/1990 | Barreto ................. | A01K 1/033 119/482 |
| 2001/0032544 A1 | * | 10/2001 | Taylor .................. | A01K 1/0107 96/19 |
| 2015/0068466 A1 | * | 3/2015 | Piccioni .............. | E04B 1/34363 119/448 |

FOREIGN PATENT DOCUMENTS

EP     3095322 A1 *  11/2016  .............. A01K 1/033

* cited by examiner

*Primary Examiner* — Yvonne R Abbott-Lewis
(74) *Attorney, Agent, or Firm* — Mark Terry

(57) ABSTRACT

Pet furniture for accommodating dogs, including a wall and an opening disposed in the wall to allow passage for a dog, wherein the wall comprises a grid which surrounds an internal space enclosed by the wall except for the opening, and wherein the grid is formed of an electrically conductive material to shield against electromagnetic radiation.

12 Claims, 1 Drawing Sheet

PET FURNITURE FOR ACCOMMODATING DOGS

CROSS-REFERENCE TO RELATED APPLICATIONS

This patent application claims priority to German utility patent application number 20 2017 104 845.4 filed Aug. 11, 2017 and titled "Pet Furniture for Accommodating Dogs". The subject matter of patent application number 20 2017 104 845.4 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

Pet furniture for accommodating dogs is already known. Pet furniture of this type is used for instance in the form of a dog crate inside the home.

Conventional pet furniture consists of an internal space which is enclosed by a wall. Furthermore, the wall comprises an opening disposed in the wall to allow passage for a dog. In this context, the wall consists for example of wood or plastic.

An essential function of pet furniture is to protect the pet staying therein from various environmental influences. Pet furniture with a wall made of wood or plastic which is closed except for the opening offers the pet shelter from rain, wind and strong sunlight. At the same time, the internal space of conventional pet furniture can provide shielding against noise from the outside of the pet furniture.

In connection with pet furniture of prior art it is further known that the pet staying therein is shielded from the influence of electromagnetic radiation. For this purpose, EP 3 095 322 A1 describes a piece of pet furniture for accommodating pets, including a wall which encloses an internal space for housing a pet, wherein an opening is formed in the wall through which the pet can enter the interior. The wall comprises a metallic material to provide shielding against electromagnetic radiation incident on the pet furniture from the outside. The type of electromagnetic radiation is, for example, radio waves, mobile radio waves, radiation from radio networks and other types of radiation primarily in the microwave range. The piece of pet furniture shown works well in terms of shielding, but is complex from the point of view of the materials used and the method of manufacture, and in the market is found in the luxury segment.

SUMMARY

The invention relates to a piece of pet furniture for accommodating dogs.

It is therefore an object of the present invention to provide a piece of pet furniture for accommodating dogs, which shields the interior of the pet furniture against electromagnetic radiation and can be produced efficiently.

This object is achieved by a piece of pet furniture for accommodating dogs according to claim 1. The subject-matter of the subclaims in each case relates to advantageous aspects of the invention.

DETAILED DESCRIPTION

Figure 1:
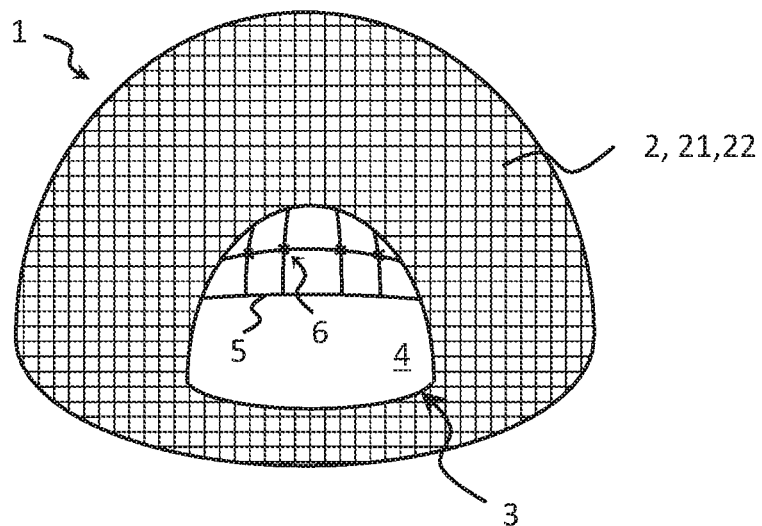
FIG. 1 shows a schematic representation of a piece of pet furniture for accommodating dogs.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments relate to a piece of pet furniture for accommodating dogs.

This object is achieved by a piece of pet furniture for accommodating dogs according to claim 1. The subject-matter of the subclaims in each case relates to advantageous aspects of the invention.

The invention comprises a piece of pet furniture for accommodating dogs, including a wall and an opening disposed in the wall to allow passage for a dog. The wall comprises a grid which surrounds an internal space enclosed by the wall (completely and continuously) except for the opening. In this context, the grid made of an electrically conductive (metallic) material is formed in such a way as to provide shielding (and reduce the amplitude) against electromagnetic radiation. In this regard, the grid is designed such that the transmittance of electromagnetic waves of certain wavelengths (radio waves, mobile radio waves, radiation from radio networks) through the grid is less than one (preferably less than 0.8).

Preferably, the grid openings of the grid have a uniform size. The grid openings thereby can be formed both round and square.

According to an advantageous aspect, the grid openings each have a diameter of between 0.05 cm and 1.5 cm. Thereby, the diameter of the grid openings is chosen so as to provide shielding against electromagnetic waves in a certain frequency range.

In this context, it is particularly advantageous if the grid comprises one or more of the materials iron, copper, brass, aluminum, silver, gold, stainless steel or mixtures thereof. In this regard, the materials used for the grid are chosen so as to determine both the weight and the shielding effect of the grid against electromagnetic radiation.

Here, it is particularly preferred that the grid is made of a wire of a thickness of 0.005 cm to 0.2 cm. In this context, the cross-section of the wire can be formed both round and polygonal.

It is further preferred in this context that the grid is completely encased by a plastic. The plastic thereby encases the grid with a thickness of 0.001 cm to 0.5 cm, so that the grid is protected against corrosion and at the same time the shielding effect is realized.

According to an advantageous aspect, the wall is of a multilayer structure. In this regard, the wall includes a first layer composed of the grid and a second layer composed of a cladding enclosing the grid. Here, the cladding can be formed with one or more layers.

It is also preferred that the cladding is a mesh made of plastic strips or rattan. The mesh thereby comprises openings of the size of 0.01 cm to 3 cm.

According to a further advantageous aspect, the pet furniture comprises a frame made of metal rods. The cross-section of the metal rods is designed so as to be round or polygonal with a thickness of 0.5 cm to 2 cm and is designed so as to increase the stability of the pet furniture.

It is preferred that the pet furniture further comprises connecting members for fastening the grid to the frame. The connecting members can be designed as a clamping element or wire. This makes it possible to establish a connection in a quick manner.

According to an advantageous aspect, the opening makes up a proportion of 10% to 20% of the total area of the wall. The opening can be both round and polygonal and can have a diameter of between 10 cm and 50 cm.

It is advantageous if the volume of the internal space is between 30 liters and 100 liters. Thereby, the size of the volume of the internal space is chosen so as to ensure housing of the dog within the pet furniture.

FIG. 1 shows an example of the pet furniture 1 for accommodating dogs, including a wall 2 and an opening 3 disposed in the wall 2 to allow passage for a dog. Here, the wall 2 comprises a grid 21 which surrounds an internal space 4 enclosed by the wall 2 except for the opening 3. In this regard, the grid 21 is formed of an electrically conductive material so as to provide shielding against electromagnetic radiation. In the example shown, the grid 21 is made of a metal.

The grid 21 is completely encased by a plastic to provide protection against corrosion. Hence, the pet furniture can also be sprayed out with water for cleaning.

A frame 5 made of metal rods is disposed in the pet furniture shown. On the one hand, the frame improves the stability of the pet furniture, but also serves to fasten the grid to the frame. Advantageously, the illustrated pet furniture includes connecting members 6 for fastening the grid 21 to the frame 5.

The opening 3 shown makes up a proportion of approx. 15% of the total area of the wall 2. The size of the opening thus enables passage for a dog.

In the advantageous example, the volume of the internal space 4 is approx. 60 liters. Here, however, the volume is dependent on the size of the dog which is to be accommodated within the pet furniture.

Figure 2A:
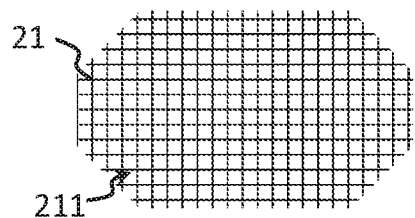
FIG. 2a shows a schematic representation of a first embodiment of the grid with wide grid openings.
Figure 2B:
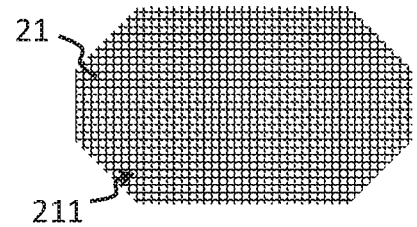
FIG. 2b shows a schematic representation of a second embodiment of the grid with narrow grid openings.

FIGS. 2a and 2b show, by way of example, two embodiments of the grid 21. In this context, in both embodiments, the grid openings 211 have a uniform size. It is particularly advantageous here if the grid 21 is made of a wire of the thickness (as shown) of 0.1 cm.

The illustrated grid openings 211 each have a diameter of 0.05 cm (FIG. 2b) or 1.5 cm (FIG. 2a). The diameter of the grid openings 211 essentially determines the shielding effect (at a certain frequency) of the grid 21 against electromagnetic radiation. The grid openings thus correspond approximately to the wavelength of the electromagnetic radiation shielded at maximum. Usual household radiation sources transmit at frequencies corresponding to a wavelength of 0.5 cm to 1.5 cm, and therefore the size of the grid openings has been chosen accordingly in experiments. Experiments with electromagnetic transmitters and receivers have clearly shown the shielding effect of the internal space against electromagnetic radiation.

Figure 3:
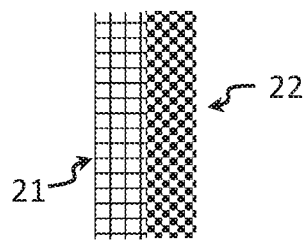
FIG. 3 shows a representation of a section through the cladding, which is designed with multiple layers, including a first layer composed of the grid and a second layer composed of a cladding enclosing the grid.

FIG. 3 shows an example of a portion of the wall 2 in cross-section. Thereby, the wall 2 has a multilayer structure. The wall 2 comprises a first layer composed of the grid 21 and a second layer composed of a cladding 22 enclosing the grid 21.

The illustrated cladding 22 is a mesh made of plastic strips.

What is claimed is:

1. Pet furniture for accommodating dogs, including a wall and an opening disposed in the wall to allow passage for a dog, wherein the wall comprises a grid which surrounds an internal space enclosed by the wall except for the opening, and wherein the grid is formed of an electrically conductive material to shield against electromagnetic radiation.

2. Pet furniture according to claim 1, wherein the grid openings of the grid have a uniform size.

3. Pet furniture according to claim 2, wherein the grid openings each have a diameter of between 0.05 cm and 1.5 cm.

4. Pet furniture according to claim 3, wherein the grid comprises one or more of the materials iron, copper, brass, aluminum, silver, gold, stainless steel or mixtures thereof.

5. Pet furniture according to claim 4, wherein the grid is made of a wire of a thickness of 0.005 cm to 0.2 cm.

6. Pet furniture according to claim 5, wherein the grid is completely encased by a plastic material.

7. Pet furniture according to claim 6, wherein the wall is of a multilayer structure, and wherein the wall comprises a first layer composed of the grid and a second layer composed of a cladding enclosing the grid.

8. Pet furniture according to claim 7, wherein the cladding is a mesh made of plastic strips or rattan.

9. Pet furniture according to claim 8, further comprising a frame made of metal rods.

10. Pet furniture according to claim 9, further comprising connecting members for fastening the grid to the frame.

11. Pet furniture according to claim 10, wherein the opening makes up a proportion of 10% to 20% of the total area of the wall.

12. Pet furniture according to claim 11, wherein the volume of the internal space is between 30 liters and 100 liters.

* * * * *